United States Patent [19]

Naidich et al.

[11] 4,210,912

[45] Jul. 1, 1980

[54] PULSED DOPPLER MOVING TARGET DETECTOR

[75] Inventors: Herbert H. Naidich; John E. Westmark, both of Cincinnati, Ohio

[73] Assignee: Cincinnati Electronics Corporation, Cincinnati, Ohio

[21] Appl. No.: 887,670

[22] Filed: Mar. 16, 1978

[51] Int. Cl.² ............................................. G01S 9/42
[52] U.S. Cl. .................................................... 343/7.7
[58] Field of Search .................. 343/7.7, 16 LS, 5 PD

[56] References Cited

U.S. PATENT DOCUMENTS

| | | | |
|---|---|---|---|
| 3,382,496 | 5/1968 | Matsukasa et al. | 343/7.7 |
| 3,422,428 | 1/1969 | Jensen | 343/7.7 |
| 3,581,310 | 5/1971 | Buckley | 343/7.7 |
| 3,633,203 | 1/1972 | Kreinheder | 343/16 LS |
| 3,680,074 | 7/1972 | Lieser | 343/5 PD |
| 3,691,558 | 9/1972 | Hoard et al. | 343/7.7 |
| 3,859,659 | 1/1975 | Heft | 343/7.7 |
| 4,038,658 | 7/1977 | Nelson et al. | 343/7.7 |

*Primary Examiner*—Malcolm F. Hubler
*Attorney, Agent, or Firm*—Lowe, King, Price and Becker

[57] ABSTRACT

A pulsed doppler radar for detecting a moving target includes a plurality of antennae with patterns covering different spatial regions, wherein adjacent regions have overlapping spatial regions. Pulses having a predetermined carrier frequency are applied to the antennae in sequence. Energy from the pulses incident on the moving target is reflected back toward the antennae with a shift in carrier frequency. A plurality of signal processing channels, one for each antenna, are sequentially responsive to reflected energy transduced by the antennae associated with the channels. Each of the channels includes a doppler filter for passing a continuous wave replica of the shifted carrier frequency to the exclusion of the transmitted carrier frequency. Signals from adjacent channels are combined to derive signals representing sum and difference patterns of adjacent antennae. If any one of the sum or difference channel output signals has an amplitude greater than a predetermined value, a moving target indication is provided.

13 Claims, 6 Drawing Figures

PULSED DOPPLER MOVING TARGET DETECTOR

FIELD OF THE INVENTION

The present invention relates generally to pulsed doppler systems, and more particularly to a pulsed doppler system wherein plural radiators with patterns having differing spatial regions are energized in sequence and separate processing channels, one of which is provided for each of the radiators, are sequentially responsive to reflected energy transduced by the radiator.

BACKGROUND OF THE INVENTION

The principles of pulsed doppler systems for detecting the presence of a moving target are applicable to radar, sonar, and other types of radiant energy, such as optical energy. However, pulsed doppler systems are usually employed in connection with radar and the ensuing description is confined to that particular art, although it is to be understood that the principles of the invention are applicable to other related arts.

A class of radar has been developed to detect the presence of a moving target in the presence of non-moving (clutter) radar echoes. Such systems are frequently termed intrusion detectors because it is desired to detect the presence of a moving target to the exclusion of stationary targets. While range and angular direction can be obtained with pulsed doppler radar systems, the derivation of this information is secondary to detecting a moving target in the presence of non-moving targets.

Several different types of systems have been developed utilizing pulsed doppler techniques to detect a moving target in the presence of non-moving targets. In one system, a simple, single antenna having an omnidirectional pattern is adequate to cover a volume of space to be protected against intrusion. However, the single antenna frequently does not provide the desired results because the antenna pattern is materially modified by obstructions. For example, pulsed radar systems are often deployed on aircraft having structures, such as tail and fuselage members, which prevent the pattern of a single antenna from having optimum gain over a large field of view.

To increase the field of view and provide greater gain, plural antennae are utilized. The several antennae frequently have overlapping patterns, each assigned to subsectors of an entire volume to be protected against intrusion. While most of the prior art systems include two antennae, it is to be understood that multiple antennae can be utilized for multiple obstacles, or for very high gain antenna arrays. In the following discussion, only two antennae are considered, but it is to be understood that the same problems are extant with more than two antennae. Similarly, when the improved system of the present invention is discussed, only two antennae are usually discussed, but it is to be understood that the principles of the invention are applicable to more than two antennae.

The multiple, prior art antennae are often connected together so they are simultaneously energized to radiate at the same time in response to a single energy pulse. When the antennae are simultaneously energized, they are also usually simultaneously responsive to a return, reflected signal from a target. To enable the antennae to cover a protected volume, it is necessary for adjacent antennae to have patterns with overlapping spatial regions. However, the overlapping regions cause interference "lobes" that can cause deep nulls in a composite pattern, with a resulting loss of reflected signal to the antenna array. This effect is well-known and is illustrated, for example, in FIG. 3.12 of "Radar Systems Analysis", published by Prentis-Hall, 1964.

To obviate the problems associated with interference "lobes", each antenna of an array is sequentially energized by a radar pulse so that antennae having overlapping patterns are not simultaneously energized. By sequentially energizing different adjacent antennae, a protected volume of interest is effectively scanned. Reflected, return signals from a target are supplied by the antennae of the array to a single receiver including a high Q, doppler filter bank of contiguous filters. The doppler filters respond to reflected pulses having a carrier frequency that is shifted from the carrier frequency of the pulse energy originally activating the antennae. A high Q, typically crystal, filter attenuates the response to each reflected pulse from the non-doppler shifted return which corresponds to the non-moving "clutter" echoes.

The problem with this approach is that stationary targets have a tendency to appear as moving targets. Switching the antennae in sequence and feeding the sequential return signals from the plural antennae to a single channel causes "clutter" from the stationary targets to be modulated with harmonics of the antenna switching frequency. These clutter harmonics pass through the doppler filter and appear as noise that severely limits the sensitivity of the system to true moving targets which produce a doppler shift in the carrier frequency.

BRIEF DESCRIPTION OF THE INVENTION

The present invention employs a plurality of sequentially energized radiation transducers with patterns covering differing spatial regions. The transducers are energized by pulses having a predetermined carrier frequency. An important distinction over the prior art is that a plurality of signal processing channels, one for each of the radiators, is provided. Each of the channels is responsive to reflected energy from the target transduced by the transducer associated with the channel; thereby each channel is responsive to the reflected energy at differing times. Each of the channels includes a doppler filter for deriving a continuous wave replica of the doppler shifted carrier frequency reflected from the moving target; the doppler filter does not pass the carrier frequency transmitted from the transducer. The energy passed by the doppler filter represents the pattern of reflected energy from the moving target for the transducer associated with the particular channel. If the signal associated with any of the channels exceeds a predetermined value, an indication of a moving target in the protected zone is derived.

The system avoids the interference "lobes" associated with simultaneously energizing a plurality of elements in the array. In addition, the clutter switching harmonics associated with sequentially energizing a plurality of elements and supplying the reflected signals transduced by the elements to a single channel are avoided because the clutter switching harmonics are higher in frequency than the doppler filter pass band. Because a different doppler filter is provided for each of the elements, there is no possibility of the different harmonics being mixed in the filters whereby there are no noisy clutter harmonics that limit the sensitivity of the system to true moving targets.

In accordance with a further aspect of the invention, a possible loss of sensitivity due to adjacent transducers having overlapping patterns is obviated by feeding the continuous wave outputs of doppler filters from adjacent channels to sum and difference networks which derive signals representing sum and difference patterns of adjacent transducers. If there is a tendency for interference between the patterns of adjacent transducers, it is compensated because either the sum pattern or difference pattern has a relatively large amplitude. The amplitudes of the sum and difference patterns are detected and if either is above a predetermined level, an indication is provided of the presence of a moving target in the protected zone. The sum and difference pattern signals are used in addition to the patterns representing the response of the individual transducers.

In accordance with a further aspect of the invention, the system can be utilized to obtain range and in certain instances, angle information. Range information can be obtained by utilizing range gating techniques whereby the transduced signal is supplied to the doppler filters only during certain intervals, associated with the distance from the transducers to be protected. The angle information can be derived from the sum and difference pattern representing signals if the patterns of a pair of adjacent transducers have overlapping regions. However, in most instances, adjacent transducers are spaced by several wavelengths of the processed carrier and therefore do not have overlapping patterns.

It is, accordingly, an object of the present invention to provide a new and improved pulsed doppler system.

Another object of the present invention is to provide a new and improved pulsed doppler system utilizing multiple radiation transducers, wherein problems associated with interference "lobes" of adjacent transducers are obviated.

A further object of the invention is to provide a new and improved pulsed doppler system employing multiple radiation transducers that are sequentially activated and wherein clutter from stationary targets has virtually no effect on the system.

Another object of the invention is to provide a new and improved pulsed doppler system employing multiple, sequentially energized radiation transducers wherein clutter from stationary moving targets is not coupled through doppler filters, nor does the clutter interact in the doppler filters with return signals from different radiation transducers.

A further object of the invention is to provide a new and improved pulsed doppler system that is highly sensitive to true moving targets.

An additional object is to provide a new and improved pulsed doppler system with range and, in certain instances, finding capabilities.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
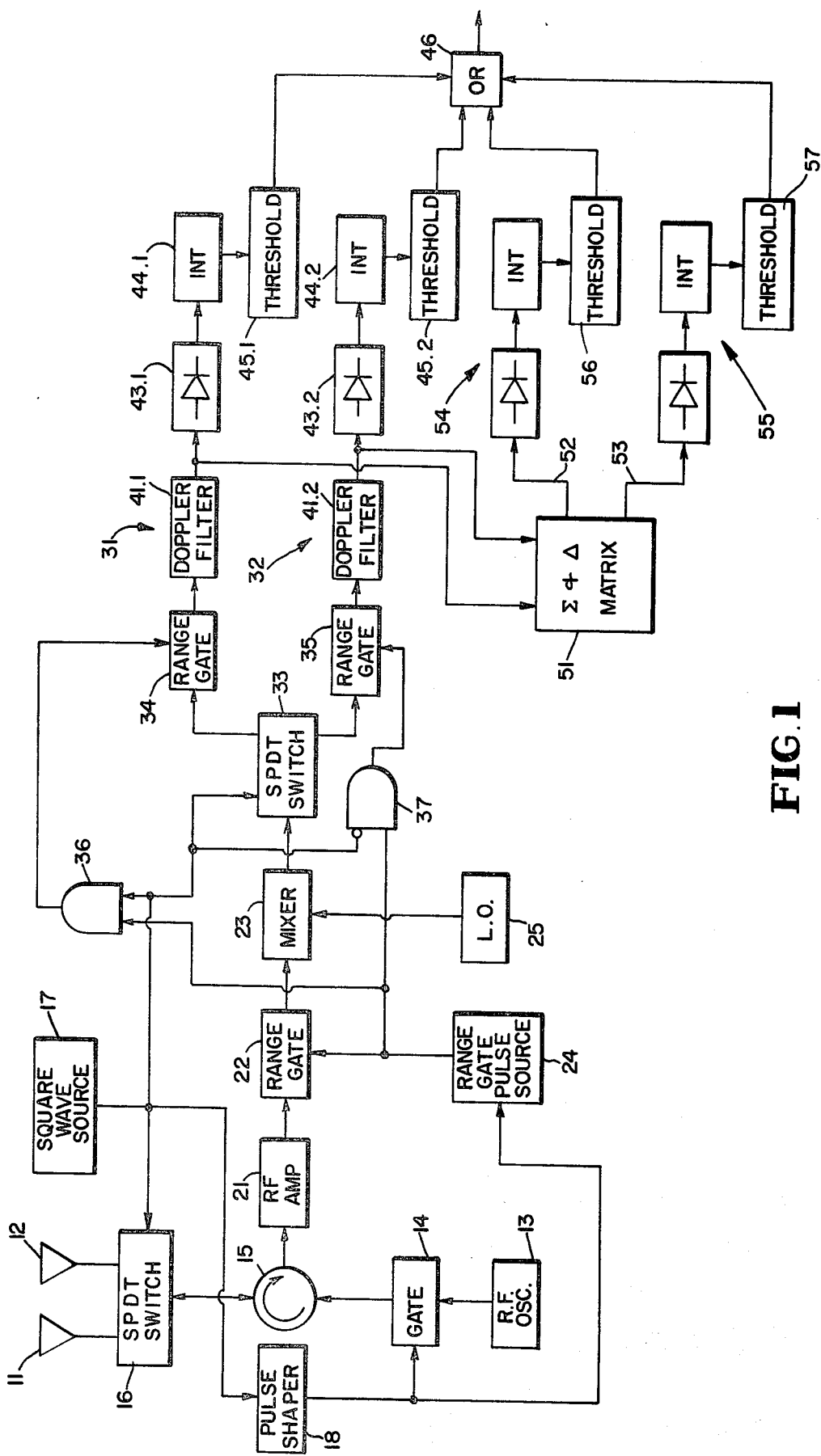
FIG. 1 is a block diagram of a preferred embodiment of the invention.

The pulsed doppler radar system of FIG. 1 includes a pair of spaced antennae 11 and 12 having radiation patterns covering a region desired to be monitored for intrusion purposes. The system determines if a moving target is in the region. To provide adequate coverage for the region, there is usually a slight overlap between the patterns of antennae 11 and 12, a result achieved by spacing the antennae several wavelengths apart at the frequency of the carrier exciting them. In certain instances, however, where it is important to derive an indication of the angle of the intruding, moving target, antennae 11 and 12 may have overlapping patterns.

Antennae 11 and 12 are sequentially supplied with pulses of a predetermined RF carrier frequency derived from RF oscillator 13. RF oscillator 13 is sequentially coupled to antennae 11 and 12 by RF gate 14, circulator 15, and electronic, RF single pole, double throw switch 16. Gate 14 and switch 16 are controlled in response to outputs of square wave source 17 and pulse shaper 18.

Figure 2A:
FIGS. 2a–2c are illustrations of waveforms which assist in describing the operation of FIG. 1.
Figure 2B:

As illustrated in FIG. 2a, square wave source 17 activates single pole, double throw switch 16 so that antennae 11 and 12 are alternately coupled to circulator 15 through the switch for equal, non-simultaneously occurring time intervals that immediately follow each other. As illustrated in FIG. 2b, at the beginning of each interval RF oscillator 13 is coupled through gate 14 to circulator 15 and thence to one antennae 11 or 12 through switch 16. Gate 14 is open only for a relatively short duration at the beginning of each interval so that one of antennae 11 or 12 is coupled to circulator 15. To this end, each transition of square wave source 17 is sensed by pulse shaper 18 which responds to the transition to derive an output pulse having a relatively short duration. The relatively short duration output pulse of shaper 18 is applied as an enabling signal to gate 14, to open the gate so that the RF energy pulse is coupled by oscillator 13 to one of antennae 11 or 12.

Energy reflected from a target in the pattern of antenna 11 and/or antenna 12 is returned to the antenna(e) and coupled through switch 16 and circulator 15 to an input of RF amplifier 21. The period of source 17 and the effective range of the receiver of the invention are such that a return signal to antenna 11 or antenna 12 generally occurs during the half cycle of source 17 during which the particular antenna was responsive to the RF pulse coupled through gate 14.

The pulse output of RF amplifier 21 is selectively fed through range gate 22 to mixer 23. Range gate 22 is opened in response to pulses from range gate pulse source 24, which derives a pulse during a time interval associated with a particular range from antennae 11 and 12 which is desired to be covered for intrusion purposes. The occurrence time and duration of pulses from source 24, relative to the occurrence time of pulses transmitted from antennae 11 and 12 (sensed by source 24 because of the output of shaper 18 being coupled to it), can be either predetermined or controlled manually.

Pulses coupled through range gate 22 and a heterodyning output of local oscillator 25 are combined in mixer 23 that derives an IF, beat frequency. The output of mixer 23 is a predetermined, constant frequency for stationary targets in the patterns of antennae 11 and 12. If, however, there is an intrusion by a moving target in the patterns of antennae 11 and 12, mixer 23 derives an IF output having a frequency displaced from the predetermined frequency by an amount associated with the velocity of the target. Moving targets of interest for which the present system is designed to detect for intrusion purposes typically have frequencies displaced from the predetermined frequency by 1 to 4 kHz.

The system described so far in connection with FIG. 1 is generally known to those skilled in the art.

In accordance with the present invention, a pair of signal processing channels 31 and 32, respectively associated with antennae 11 and 12, are provided. Channels 31 and 32 are sequentially responsive to return signals to antennae 11 and 12 so that channel 31 is responsive to the return signals reflected to antenna 11, while channel 32 is responsive to the return signal of antenna 12. Channels 31 and 32 are activated so that the output of mixer 23 associated with antenna 11 is supplied to channel 31 to the exclusion of channel 32 and vice versa for the output of mixer 23 associated with antenna 12.

To these ends, the IF, beat frequency output of mixer 23 is sequentially coupled to channels 31 and 32 through single pole, double throw switch 33. Switch 33 is controlled by the square wave output of source 17 so that when source 17 activates switch 16 to connect antenna 11 with circulator 15, the output of mixer 23 is coupled to channel 31; when source 17 activates switch 16 so that antenna 12 is coupled to circulator 15, switch 33 is activated to couple the output of mixer 23 to channel 32.

Figure 2C:

Channels 31 and 32 respectively include range gates 34 and 35 which are activated so that return signals to antenna 11 are invariably coupled to the remainder of channel 31 while return signals to antenna 12 are invariable coupled to the remainder of channel 32. Range gates 34 and 35 assist the operation of range gate 22. Hence, gate 34 prevents return signals to antenna 12, resulting from pulsed energy being supplied to antenna 11, from being coupled to channel 32; similarly gate 35 prevents return signals to antenna 11, in response to energization of antenna 12, from being coupled to channel 31. Range gates 34 and 35 are respectively controlled by the outputs of AND gates 36 and 37, both of which are responsive to the outputs of square wave source 17 and range gate pulse source 24. AND gate 36 is directly responsive to the outputs of sources 17 and 24 so that a positive, enabling pulse is derived by AND gate 36 during the time intervals signified by pulses L, FIG. 2C. AND gate 37 includes an inverting input responsive to the output of square wave source 17, whereby AND gate 37 derives an enabling signal for range gate 35 during alternate half cycles of square wave source 17, as indicated by pulses R, FIG. 2c.

The pulses passed through range gates 34 and 35 are respectively supplied to the remaining processing circuitry in channels 31 and 32. Because the remaining circuitry of channels 31 and 32 is identical for the two channels, a description of the circuitry included in channel 31 suffices. The remaining circuits in channel 31 are generally indicated by reference numerals followed by 0.1, while corresponding circuits in channel 32 are indicated by reference numerals followed by 0.2. When the circuit elements are specified in a general manner, for either channel, the 0.1 and 0.2 designations are not employed.

The pulsed IF output of range gate 34 is applied to doppler filter 41.1, having a bandpass displaced from the IF output frequency of mixer 23 by 1 to 4 kHz. Filter 41.1 derives a continuous wave output at the frequency passed by it in response to the pulsed input thereof. The skirts of filter 41.1 are such that there is negligible output of the filter in response to the output of mixer 23 being the predetermined carrier frequency associated with stationary targets.

Doppler filter 41.1 can be implemented in many ways depending on system requirements. In one embodiment, filter 41.1 includes crystal filters and homodyne mixers, a well known configuration. Doppler filter 41.1 can also be implemented by a digital computer that derives an output in numerical form. As shown in FIG. 1, it is implied that there is no change in the carrier or IF frequency applied to filter 41.1; however, the input to the doppler filter could be at a new IF frequency if hardware tradeoffs so dictate. A typical example of such a filter is illustrated in the "Radar Handbook", edited by M. I. Skolnick, p. 19–7, FIG. 6, published by McGraw-Hill, 1970. It is also to be understood that filter 41.1 can also include means for automatically adjusting the filter center frequency as a function of the velocity of a platform on which the system is mounted so that the clutter could be "trapped"; this is particularly important if the system is mounted on a moving platform, such as an aircraft.

The continuous wave output of doppler filter 41.1, drives rectifier 43.1, which in turn drives integrator 44.1. Rectifier 43.1 converts the IF output of the doppler filter into a DC voltage that is filtered and smoothed by integrator 44.1. Integrator 44.1 derives a continuous, DC signal having an amplitude representing the pattern of reflected, moving target energy coupled to antenna 11. Other means for accomplishing detection and integration can include numerical computer techniques which are often implemented in modern systems. Integrator 44.2 responds to the output of range gate 35 to derive a similar signal representing the pattern of reflected energy for a moving target transduced by antenna 12. Because doppler filters 41.1 and 41.2 are responsive solely to energy reflected from antennae 11 and 12, respectively, and not to energy reflected to both antennae, there is no mixing of the reflected energy from the two antennae in the doppler filters and no opportunity for beat frequency outputs from the separate returns to antennae 11 and 12 to be derived from the separate doppler filters. While there is a possibility for harmonics to be derived in doppler filters 41.1 and 41.2 in response to switching transients of the energy coupled to the inputs of the doppler filters, these harmonics are outside of the pass bands of the doppler filters, are not passed by them, and are not handled by channels 31 and 32 as return signals from moving targets.

To determine if the outputs of integrators 44.1 and/or 44.2 are associated with moving target returns to antennae 11 and/or 12, the outputs of the integrators are respectively supplied to threshold circuits 45.1 and 45.2. In response to the input signals supplied by integrators 44.1 and 44.2 to threshold detectors 45.1 and 45.2 being above a predetermined, threshold value, the threshold detectors derive binary one outputs that are coupled to inputs of OR gate 46. In response to either or both of threshold detectors 45.1 or 45.2 deriving a binary one signal, indicative of a moving target return, OR gate 46 derives a binary one signal to warn of an intrusion of a moving target into the zone being protected.

When a pair of antennae 11 and 12 are utilized, it is necessary for the antennae patterns to have overlapping spatial regions in order for the whole region of interest to be covered. However, the total, overlapping antenna pattern has areas that are reduced in system sensitivity. For example, if adjacent antennae 11 and 12 are oriented so that their antenna patterns overlap at the one way, half power (3 db) points, there is a 6 db loss in sensitivity for the radar system at the angle of overlap. Because the overlap angle frequently is along a boresight axis of an antenna system including antennae 11 and 12, i.e., along a line halfway between antennae 11 and 12, this loss of sensitivity frequently is quite deleterious. In accordance with another aspect of the invention, the loss in sensitivity is compensated by deriving sum and difference patterns for the adjacent antennae 11 and 12.

To these ends, the outputs of doppler filters 41.1 and 41.2 are applied to sum and difference matrix 51, which algebraically combines the continuous wave, approximately IF outputs of the doppler filters. Matrix 51 derives signals on leads 52 and 53 respectively representing the algebraic sum and difference of the continuous wave outputs of filters 41.1 and 41.2. The sum and difference signals on leads 52 and 53 are respectively applied to detector/integrator circuits 54 and 55; each of detector/integrator circuits 54 and 55 includes circuitry identical to the rectifier 43, and integrator 44 circuitry in the channels directly responsive to filters 41. Thereby, detector/integrator circuits 54 and 55 derive DC signals representing the amplitude of the sum and difference AC inputs applied to them. The outputs of detector/integrators 54 and 55 are respectively applied to threshold detectors 56 and 57 which derive binary one outputs in response to the inputs thereof being above a threshold level. The outputs of threshold detectors 56 and 57 are supplied to OR gate 46 so that the OR gate derives a binary one output in response to any of threshold detectors 45.1, 45.2, 56 or 57 deriving a binary one output. A binary one output of OR gate 46 thereby signifies the presence of a moving target in the zone monitored by antennae 11 and 12 for the range set into source 24.

Figure 3:
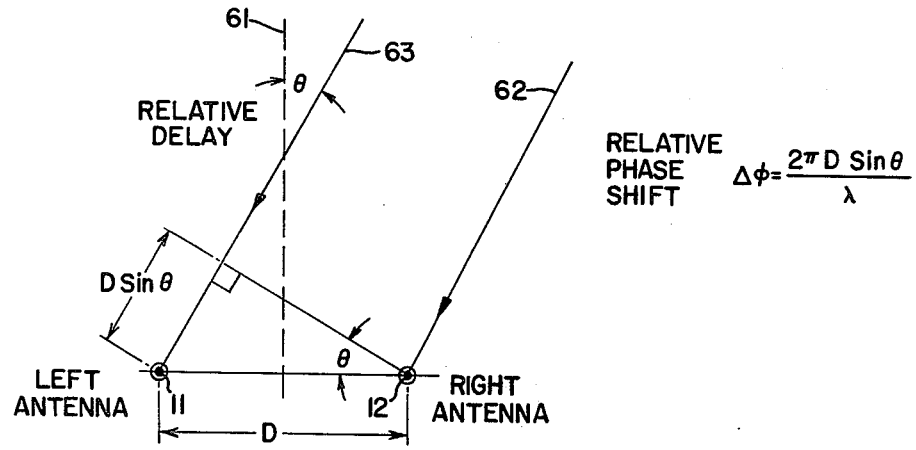
FIG. 3 is a schematic illustration of the relationship between a pair of antennae in the system of FIG. 1.

The manner in which the sum and difference matrix 51 functions to increase the system sensitivity in the overlap region of the patterns of antennae 11 and 12 is described in connection with FIGS. 3 and 4. In FIG. 3, it is assumed that antennae 11 and 12 are separated from each other by a distance D and that equal amplitude reflected energy is incident on the two antennae. It is also assumed that the reflected energy is derived from a moving target sufficiently remote from the antennae to be propagated back to both antennae along parallel rays, 62 and 63, that subtend an angle $\phi$ to the right of bisector 61 between antennae 11 and 12. It is also assumed that the carrier frequency of the reflected energy is $\lambda$, and that variations in $\lambda$ due to doppler frequency shift changes are relatively insignificant.

In such a situation, the energy returned to antenna 11, relative to the energy received at antenna 12, is delayed by a distance $D\sin\phi$. For energy at a carrier wave length $\lambda$, the phase lag of the energy received at antenna 11 relative to the energy at antenna 12 is:

$$\Delta\phi = (2\pi D \sin\theta/\lambda) \tag{1}$$

The phase lag is translated in frequency by mixer 23 so that the phase difference of the outputs of doppler 41.1 and 41.2 are continuous wave replicas of the phase difference between the signals transduced by antennae 11 and 12. Sum and difference matrix 51 responds to the outputs of doppler filters 41.1 and 41.2 to derive sum and difference signals respectively represented by:

$$\Sigma = 2 \cos [\Delta\phi/2] = 2 \cos [\pi D/\lambda \sin\theta] \tag{2}$$

$$\Delta = 2 \sin [\Delta\phi/2] = 2 \sin [\pi D/\lambda \sin\theta] \tag{3}$$

Figure 4:
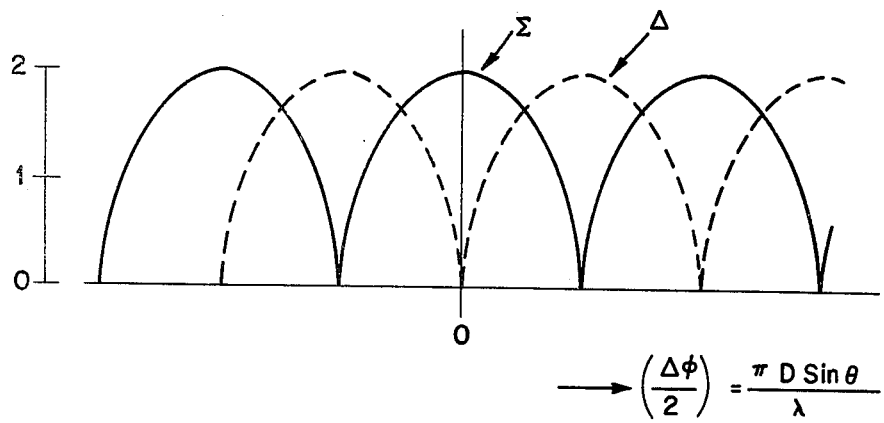
FIG. 4 is an illustration of the sum and difference patterns of the pair of antennae illustrated in FIGS. 1 and 3.

Equations 2 and 3 are respectively plotted as solid and dashed lines in FIG. 4 which indicate the magnitudes of the sum and difference signals as a function of the sine of the angle of rays 62 and 63 relative to bisector 61. From FIG. 4, maximum sum and null difference signals are derived when a target is aligned with bisector 61. As the angle $\theta$ varies, the sum and difference patterns vary in orthogonal relationships, whereby a maximum occurs in the difference pattern when a null occurs in the sum pattern. By algebraically combining the responses of doppler filters 41.1 and 41.2 in sum and difference matrix 51 there is a gain in power of four for the sum and difference outputs on leads 52 and 53 relative to the power level for channels 31 and 32 for antennae 11 and 12 individually.

In certain instances, where there is complete overlap of the patterns of antennae 11 and 12 (which is not usually the case) the angle ($\theta$) of the moving target can be derived by dividing the difference output ($\Delta$) of matrix 51 on lead 53 by the sum output ($\Sigma$) of the matrix on lead 52. The absolute value of the resulting quotient $|\Delta/\Sigma|$ is processed to solve the Equation:

$$|\Delta/\Sigma| = \tan [\Pi D/\lambda \sin\theta]$$

for $\theta$. Appropriate computer circuitry (not shown) of a well-known type, either analog or digital, can be utilized to determine the quotient and solve the Equation for $\theta$.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A pulsed doppler system for detecting a moving target wherein pulses of energy are reflected from the target in response to sequential pulse energization by a common predetermined carrier frequency of plural radiation transducers with patterns covering differing spatial regions, the reflected pulses having a carrier frequency that is shifted by the target relative to the predetermined carrier frequency of pulses incident on the target, comprising a plurality of signal processing channels, one for each of the transducers, each of said channels being responsive to reflected energy from the target transduced by the transducer associated with the channel, said channels being activated in synchronism with the sequentially energized transducers so that each channel is responsive to the reflected energy at differing times, each of said channels including filter means for passing a replica of the shifted carrier frequency to the exclusion of the carrier frequency energizing the transducer associated with the channel, means for deriving a signal indicative of the amplitude of the replica passed by the filter means; and means responsive to the signals derived from the plural channels for indicating the presence of the target.

2. A pulsed doppler radar for detecting a moving target comprising a plurality of antennae with patterns covering differing spatial regions, means for applying pulses having a common predetermined carrier frequency to the antennae in sequence so that pulses are never simultaneously applied to adjacent antennae, the energy from the pulses incident on the moving target being reflected back toward the antennae with a shift in carrier frequency, a plurality of signal processing channels, one for each of the antennae, each of said channels being responsive to reflected energy from the target transduced by the transducer associated with the channel, said channels being activated in synchronism with the sequentially energized antennae so that each channel is responsive to the reflected energy at differing times, each of said channels including filter means for passing a replica of the shifted carrier frequency to the exclusion of the carrier frequency energizing the antenna associated with the channel, means for deriving a signal indicative of the amplitude of the replica passed by the filter means, and means responsive to signals derived from the plural channels for indicating the presence of the target.

3. The radar of claim 2 wherein the patterns of adjacent antennae have overlapping spatial regions, the filter means of each channel deriving a continuous wave in response to each pulse supplied to the channel by the antenna associated with the channel, said indicating means including means for algebraically combining the continuous waves derived from channels associated with adjacent antennae.

4. The radar of claim 3 wherein said means for algebraically combining includes means for deriving signals representing the sum and difference of the continuous waves derived from channels associated with adjacent antennae.

5. The radar of claim 4 further including range gate means for selectively enabling each of the channels at differing times associated with the propagation time for electromagnetic energy propagated from the antenna of the channel to a region where it is desired to detect the moving target.

6. The radar of claim 2 wherein the patterns of adjacent antennae have overlapping spatial regions, each of the channels including means for deriving a signal representing the patterns of reflected energy of the shifted carrier frequency, to the exclusion of the predetermined carrier frequency, of the individual antennae, the indicating means including means for deriving signals representing (a) the sum pattern of reflected energy of the shifted carrier frequency, of adjacent antennae, and (b) the difference pattern of reflected energy of the shifted carrier frequency, to the exclusion of the predetermined carrier frequency, of adjacent antennae, and means responsive to any of the patterns of reflected energy exceeding a predetermined level for indicating the presence of the target.

7. The radar of claim 6 further including range gate means for selectively enabling each of the channels at differing times associated with the propagation time for electromagnetic energy propagated from the antenna of the channel to a region where it is desired to detect the moving target.

8. A pulsed doppler system for detecting a moving target wherein pulses of energy are reflected from the target in response to sequential pulse energization by a common predetermined carrier frequency of plural radiation transducers, said transducers having patterns covering differing spatial regions, the reflected pulses having a carrier frequency that is shifted by the target relative to the carrier frequency of pulses incident on the target, comprising a plurality of signal processing channels, one for each of the radiators, each of said channels being responsive to reflected energy from the target transduced by the transducer associated with the channel, said channels being activated in synchronism with the sequentially energized radiators so that each channel is responsive to the reflected energy at differing times, each of said channels including means for deriving a signal representing the pattern of reflected shifted carrier frequency energy transduced by the radiator associated with the channel, the signal being to the exclusion of reflected energy for the predetermined carrier frequency, and means responsive to the signals derived from the plural channels for indicating the presence of the target.

9. The system of claim 8 wherein the patterns of adjacent transducers have overlapping spatial regions, the indicating means including means for deriving signals representing (a) the sum pattern of reflected energy of the shifted carrier frequency, to the exclusion of the predetermined carrier frequency, of adjacent transducers and (b) the difference pattern of reflected energy of the shifted carrier frequency, to the exclusion of the predetermined carrier frequency, of adjacent transducers, and means responsive to any of the reflected energy patterns exceeding a predetermined level for indicating the presence of the target.

10. The system of claim 8 further including range gate means for selectively enabling each of the channels at differing times associated with the propagation time for energy propagated from the transducer of the channel to a region where it is desired to detect the moving target.

11. A pulsed doppler radar for detecting a moving target comprising a plurality of antennae with patterns covering differing spatial regions, means for applying pulses having a common predetermined carrier frequency to the antennae in sequence so that pulses are never simultaneously applied to adjacent antennae, energy from the pulses incident on the moving target being reflected back toward the antennae with a shift in carrier frequency, a plurality of signal processing channels, one for each of the antennae, each of said channels being responsive to reflected energy from the target being transduced by the antenna associated with the channel, said channels being activated in synchronism with the sequentially energized antennae so that each channel is responsive to the reflected energy at differing times, each of said channels including means for deriving a signal representing the pattern of reflected energy of the shifted carrier frequency, to the exclusion of the predetermined carrier frequency, of the radiator associated with the channel, and means responsive to the signals derived from the plural channels for indicating the presence of the target.

12. The radar of claim 11 wherein the patterns of adjacent antennae have overlapping spatial regions, the indicating means including means for deriving signals representing (a) the sum pattern of reflected energy of the shifted carrier frequency, to the exclusion of the predetermined carrier frequency, of adjacent antennae, and (b) the difference pattern of reflected energy of the shifted carrier frequency, to the exclusion of the predetermined carrier frequency, of adjacent antennae, and means responsive to any of the reflected energy patterns exceeding a predetermined level for indicating the presence of the target.

13. The system of claim 11 further including range gate means for selectively enabling each of the channels at differing times associated with the propagation time for energy propagated from the transducer of the channel to a region where it is desired to detect the moving target.

* * * * *